United States Patent
Kennedy et al.

(10) Patent No.: US 10,889,712 B2
(45) Date of Patent: Jan. 12, 2021

(54) STYRENIC BLOCK COPOLYMER-HYPERBRANCHED STYRENIC BLOCK COPOLYMER NETWORKS

(71) Applicants: Joseph P. Kennedy, Akron, OH (US); Turgut Nugay, Istanbul (TR); Nihan Nugay, Istanbul (TR)

(72) Inventors: Joseph P. Kennedy, Akron, OH (US); Turgut Nugay, Istanbul (TR); Nihan Nugay, Istanbul (TR)

(73) Assignee: THE UNIVERSITY OF AKRON, Akron, OH (US)

( * ) Notice: Subject to any disclaimer, the term of this patent is extended or adjusted under 35 U.S.C. 154(b) by 0 days.

(21) Appl. No.: 16/134,137

(22) Filed: Sep. 18, 2018

(65) Prior Publication Data

US 2019/0092938 A1 Mar. 28, 2019

Related U.S. Application Data (60) Provisional application No. 62/559,696, filed on Sep. 18, 2017.

(51) Int. Cl.
- C08L 53/02 (2006.01)
- C08F 297/04 (2006.01)
- C08F 293/00 (2006.01)

(52) U.S. Cl.
CPC ............ C08L 53/02 (2013.01); C08F 293/00 (2013.01); C08F 297/046 (2013.01); *C08F 2438/00* (2013.01); *C08L 2205/025* (2013.01); *C08L 2207/04* (2013.01)

(58) Field of Classification Search
CPC ....... C08F 293/00; C08F 297/00; C08L 53/00
See application file for complete search history.

(56) References Cited

U.S. PATENT DOCUMENTS

| 5,733,998 A | 3/1998 | Kennedy et al. |
| 5,753,755 A * | 5/1998 | Shachi .................... C08L 23/08 525/95 |
| 6,649,695 B1 * | 11/2003 | Rath ...................... C08L 53/00 525/191 |
| 8,889,926 B2 | 11/2014 | Kennedy et al. |

FOREIGN PATENT DOCUMENTS

WO 2017127642 A1 7/2017

OTHER PUBLICATIONS

Kali et al., Star and Hyperbranched Polyisobutylenes via Terminally Reactive Polyisobutylene-Polystyrene Block Copolymers, Macromol. Symp. 2013, 323, 37-41.*

Nugay et al., Low cost bifunctional initiators for bidirectional living cationic polymerization of olefins. II. Hyperbranched styrene-isobutylene-styrene triblocks with superior combination of properties, Journal of Polymer Science, Part A: Polymer Chemistry, 56(7), 705-713 (published online 2017).*

* cited by examiner

*Primary Examiner* — Jeffrey C Mullis
(74) *Attorney, Agent, or Firm* — Renner, Kenner Greive, Bobak Taylor & Weber (57) ABSTRACT

A thermoplastic elastomeric network is taught. The thermoplastic elastomer network includes hyperbranched styrenic block copolymers and styrenic block copolymers physically crosslinked though aggregation. Additionally, the hyperbranched styrenic block copolymers of the thermoplastic elastomeric network are a plurality of styrenic block copolymers chemically crosslinked.

4 Claims, 7 Drawing Sheets

STYRENIC BLOCK COPOLYMER-HYPERBRANCHED STYRENIC BLOCK COPOLYMER NETWORKS

CROSS-REFERENCE TO RELATED APPLICATIONS

This application claims the benefit of U.S. Provisional Application Ser. No. 62/559,696 entitled "Hyperbranched Styrene-Isobutylene-Styrene Triblock Copolymers" filed Sep. 18, 2017, which is incorporated herein by reference in its entirety.

FIELD OF THE INVENTION

The present invention relates to a novel thermoplastic elastomeric network. More particularly, the present invention relates to a novel thermoplastic elastomeric network exhibiting advantageous mechanical properties such as high strength and very low creep. Specifically, the present invention relates to the structure and synthesis of a thermoplastic elastomeric network comprising hyperbranched styrenic block copolymers and styrenic block copolymers. More specifically, the present invention relates to the structure and synthesis of a thermoplastic elastomeric network comprising hyperbranched styrenic tri-block copolymers and linear styrenic tri-block copolymers. Even more specifically, the present invention relates to the structure and synthesis of a thermoplastic elastomeric network comprising hyperbranched poly(styrene-b-isobutylene-b-styrene) copolymers and poly(styrene-b-isobutylene-b-styrene) copolymers.

BACKGROUND OF THE INVENTION

Poly(styrene-b-isobutylene-b-styrene) (SIBS) is a thermoplastic elastomer that has gained attention recently due to its high degree of biocompatibility. Due to its biocompatibility, SIBS has been found to be useful for a variety of applications, such as stent coating, stoppers, glaucoma shunt, and tubing. This linear block copolymer has a triblock structure formed by a polyisobutylene (PIS) core sandwiched between blocks of polystyrene (PS). The formulation of SIBS can be tailored for different applications by changing the weight percentage of PS or by changing the molecular weight of the polymer chains. The hard PS blocks provide SIBS with a glassy microstructure that enhances mechanical strength and rigidity of the material, while the PIS has a soft microstructure with increased chain mobility that gives the polymer its elastomeric properties. The possibility of tailoring mechanical properties, together with the high degree of biocompatibility, makes SIBS an ideal material for use in biomedical devices.

However, there is a high cost associated with making SIBS. The high cost (30-40%) of most SIBS products is largely due to the expensive bifunctional polymerization initiator needed for synthesis. Typically, that expensive bifunctional polymerization initiator is 1-(tert-butyl)-3,5-bis(2-chloropropan-2-yl)benzene (abbreviated herein as HDCCl, for hindered dicumyl chloride):

5-tert-butyl-1,3-bis(1-chloro-1-methylethyl)benzene (HDCCl)

Other initiators commonly used for the synthesis of well-defined telechelic PIBs (synthesize by living cationic polymerization (LC$^+$P) of isobutylene) include those described in U.S. Pat. No. 5,733,998 to Kennedy et al. and U.S. Pat. No. 8,889,926 to Kennedy et al., the disclosure of which are incorporated herein by reference in their entirety.

Block copolymers of similar compositions might have diverse mechanical properties due to their composite nature. Parameters such as molecular weight, block weight percentage, and polymer chain structure are known to give rise to different microstructures that, in turn, lead to different material properties. Different grades of SIBS can have very different morphologies based on the ratio of hard phase to soft phase. At lower contents of PS, the hard phase forms spherical domains through the soft matrix. As the PS content increases, the spherical domains become double gyroid structures, and as the PS content is further increased, the structure of the hard phase becomes lamellar. It is likely that the incompatibility of the soft and hard phases leads to micro-phase separations and results in the different morphologies described. It is well known that for composite systems, the interface between different phases plays a major role in the performance of the material. A weakened interface might lead to premature cracking and failure. Additionally, the method of fabrication for SIBS might play a very important role due to the incompatibility of the different phases. Therefore, different methods may result in different qualities of the interface.

However, for all of its attributes, SIBS has been found to be of modest strength and tends to exhibit higher creep than desired for many applications, including medical devices. Therefore, the need exists for a new material, useful for implantable medical devices and industrial applications, that have the key advantageous properties of SIBS, such as biocompatibility, biostability, elasticity, and processability, but that also exhibits higher strength, toughness, and diminished creep, which SIBS does not exhibit. Furthermore, this new material should be able to be synthesized without the use of a costly multi-functional initiator.

SUMMARY OF THE INVENTION

Generally, the present invention provides a thermoplastic elastomeric network comprising hyperbranched styrenic block copolymers and styrenic block copolymers physically crosslinked though aggregation, wherein the hyperbranched styrenic block copolymers are a plurality of styrenic block copolymers chemically crosslinked to each other.

In one embodiment, the styrenic block copolymers may be selected from liner tri-block copolymers. Where this is the case, the thermoplastic elastomeric network will include hyperbranched styrenic tri-block copolymers and linear styrenic tri-block copolymers. In a more particular embodiment, the linear styrenic tri-block copolymers can be linear poly(styrene-b-isobutylene-b-styrene) and the hyperbranched styrenic tri-block copolymers can be hyperbranched poly(styrene-b-isobutylene-b-styrene).

Generally, it will be appreciated that the hyperbranched styrenic block copolymers have a higher molecular weight than the styrenic block copolymers. The fact that the hyperbranched styrenic block copolymers are chemically bonded styrenic block copolymers allows this to be true.

Advantageously, the resultant thermoplastic elastomeric networks of the present invention have a tensile strength greater than ordinary styrenic block copolymers, and in at least one embodiment, have a tensile strength greater than about 20 MPa.

Similarly, the resultant thermoplastic elastomeric networks of the present invention have an elongation greater than ordinary styrenic block copolymers, and it at least one embodiment, have an elongation of greater than about 600%.

Furthermore, in other or the same embodiments, the thermoplastic elastomeric networks may have a deformation under strain of about 1.30% and/or may have a toughness of about 4.20 MPa.

In one or more embodiments, the thermoplastic elastomeric network includes from about 30 wt. % and about 50 wt. % of the styrenic block copolymers and from about 70 wt. % to about 50 wt. % of the hyperbranched styrenic block copolymers. In other embodiments, the thermoplastic elastomeric network includes from about 40 wt. % to about 45 wt. % of the styrenic block copolymers and from about 55 wt. % to about 60% wt. % of the hyperbranched styrenic block copolymers.

In a further embodiment, the present invention provides a method of synthesizing a thermoplastic elastomeric network containing hyperbranched styrenic block copolymers and styrenic block copolymers. The method includes a first step of initiating living cationic polymerization of monomers, to form polymers having living cationic ends. After the completion of the living cationic polymerization of the monomers, styrene is added, thereby conducting living cationic polymerization of styrene to the living cationic ends of the polymers to form living cationic copolymers having living cationic styrenic ends. Living cationic polymerization conditions are continued after the completion of the living cationic polymerization of the styrene that form the living cationic copolymers, whereby some of the living cationic styrenic ends are chemically crosslinked to phenyl groups of styrene within the copolymers by aromatic alkylation. This provides for the hyperbranched styrenic block copolymers. The hyperbranched styrenic block copolymers and the styrenic block copolymers are also then physically crosslinked to form the network.

It will be appreciated that, in one or more embodiments, the monomers are isobutylene monomers. In other or the same embodiments, the step of initiating can utilize 1-(tert-butyl)-3,5-bis(2-chloropropan-2-yl)benzene as the initiator. In other embodiments, the step of initiating can utilize a bi-directional initiator defined by the formula:

wherein x is Cl, OH, or OCH$_3$.

In a related embodiment of the present invention, the step of continuing living cationic polymerization conditions continues for a time period of from about 60 to about 300 minutes prior to termination, such that a total time period of synthesizing the thermoplastic elastomeric network is from about 240 to about 480 minutes.

Advantageously, the present invention provides a thermoplastic elastomeric network that is exceptional in terms of mechanical properties, such as higher strength and elongation, very low creep, and improved toughness, as desired for many applications, including implantable medical devices, but still provides the key advantages properties of SIBS, such as biocompatibility, biostability, elasticity, and processability.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF ILLUSTRATIVE EMBODIMENTS

The present invention generally relates to a network of thermoplastic elastomers having improved mechanical properties over ordinary thermoplastic elastomers. It will be appreciated that the generally recognized understanding of the term "thermoplastic elastomer" refers to the class of copolymers which consist of materials with both thermoplastic and elastomeric properties. Thermoplastic elastomers show advantages typical of both rubbery materials and plastic materials.

As use herein, the term "thermoplastic elastomeric network" means a plurality of thermoplastic elastomers of different molecular weights physically crosslinked, wherein some of the thermoplastic elastomers are styrenic block copolymers and the other thermoplastic elastomers are hyperbranched styrenic block copolymers as defined later herein.

Thus, the thermoplastic elastomeric networks of the present invention comprise hyperbranched styrenic block copolymers and styrenic block copolymers. In one embodiment of the present invention, the styrenic block copolymers are linear tri-block copolymers. The hyperbranched styrenic block copolymers are essentially defined as a plurality of styrenic block copolymers that have been chemically bonded or crosslinked to form styrenic block copolymers of much higher molecular weight than individual styrenic block copolymers, and that are branched so as to have more than the ordinary number of ends normally provided for styrenic block copolymers. Thus, for the linear tri-block copolymers of the present invention, there are two ends. Accordingly, wherein linear tri-block copolymers are used, the hyperbranched styrenic block copolymers of the present invention will have at least three ends, wherein one end of the linear tri-block copolymers is chemically bonded or crosslinked to one of the phenyl groups of the polystyrene portion of another linear tri-block copolymer. Thus, the tri-block copolymer having the phenyl group bonded, will still have two ends, and the other tri-block copolymer will still have a second end available for further bonding, providing an at least third end for the hyperbranched styrenic copolymer. With every chemical crosslink to a phenyl group, the end of that tri-block copolymer having the phenyl group bonded to another end of a tri-block copolymer will remain and the other end of the tri-block copolymer used to bond to the phenyl group will remain, thereby adding yet another branched end to the hyperbranched tri-block copolymer.

In order to provide a more reasonable description of the present invention, further characterization of the invention will be described with respect to the thermoplastic elastomeric network comprising hyperbranched styrenic tri-block copolymers and linear styrenic tri-block copolymers.

Preferably, the linear styrenic tri-block copolymer is poly(styrene-b-isobutylene-b-styrene). It will be appreciated, however, that any monomer that can be initiated and polymerized by living cationic polymerization can be used in the preparation of the tri-block copolymers. Upon completion of the polymerization via living cationic polymerization of the monomer of choice, styrene is added to continue the living cationic polymerization process. Conversion of the styrene to polystyrene via living cationic polymerization results in the linear tri-block copolymers of the present invention. The hyperbranched styrenic tri-block copolymers are the same copolymers or the combination, as selected for the linear styrenic tri-block copolymers, but chemically crosslinked together as described herein, wherein the hyperbranched styrenic tri-block copolymers will have resultant higher number average molecular weights and a greater number of living ends that the linear styrenic tri-block copolymers.

In one embodiment of the present invention, the linear styrenic tri-block copolymer is a linear poly(styrene-b-isobutylene-b-styrene) copolymer represented by the acronym SIBS; and the hyperbranched styrenic tri-block copolymer is a hyperbranched poly(styrene-b-isobutylene-b-styrene) copolymer represented with the acronym HB(SIBS), wherein n is the number of SIBS chemically crosslinked to other SIBS in order to make up the hyperbranched SIBS. It will be appreciated that n does not have a specific number as it may be different for each individual hyperbranched copolymer provided. However, n will be at least 2, as it would take at least two SIBS chemically crosslinked together to form the smallest HB(SIBS)$_n$.

As discussed above, the hyperbranched styrenic tri-block copolymers are generally defined as being "hyperbranched" because of the multiple branches formed when linear tri-block copolymers are chemically crosslinked after the polymerization of linear tri-block copolymers have been formed. For example, a hyperbranched styrenic tri-block copolymer, such as HB(SIBS)$_n$, can only be formed after the creation of the linear styrenic tri-block copolymer, i.e., SIBS. However, when undergoing chemical crosslinking, the living cationic styrenic terminal ends of the SIBS copolymer do not physically crosslink with other living cationic styrenic terminal ends, but instead undergo chemical crosslinking with a phenyl group that is not a part of the living cationic terminal end. Once chemical crosslinking at the non-terminal phenyl groups is undertaken, the SIBS copolymer becomes hyperbranched, and becomes a HB(SIBS)$_n$ copolymer. It will be appreciated that SIBS copolymers will only crosslink physically. Accordingly, HB(SIBS)$_n$ copolymers do not include any SIBS copolymers that are physically crosslinked end-to-end. End-to-end crosslinking will be physical crosslinking between two SIBS copolymers, a SIBS and HB(SIBS)$_n$ copolymer and a SIBS copolymer, or two HB(SIBS)$_n$ copolymers.

Figure 1:
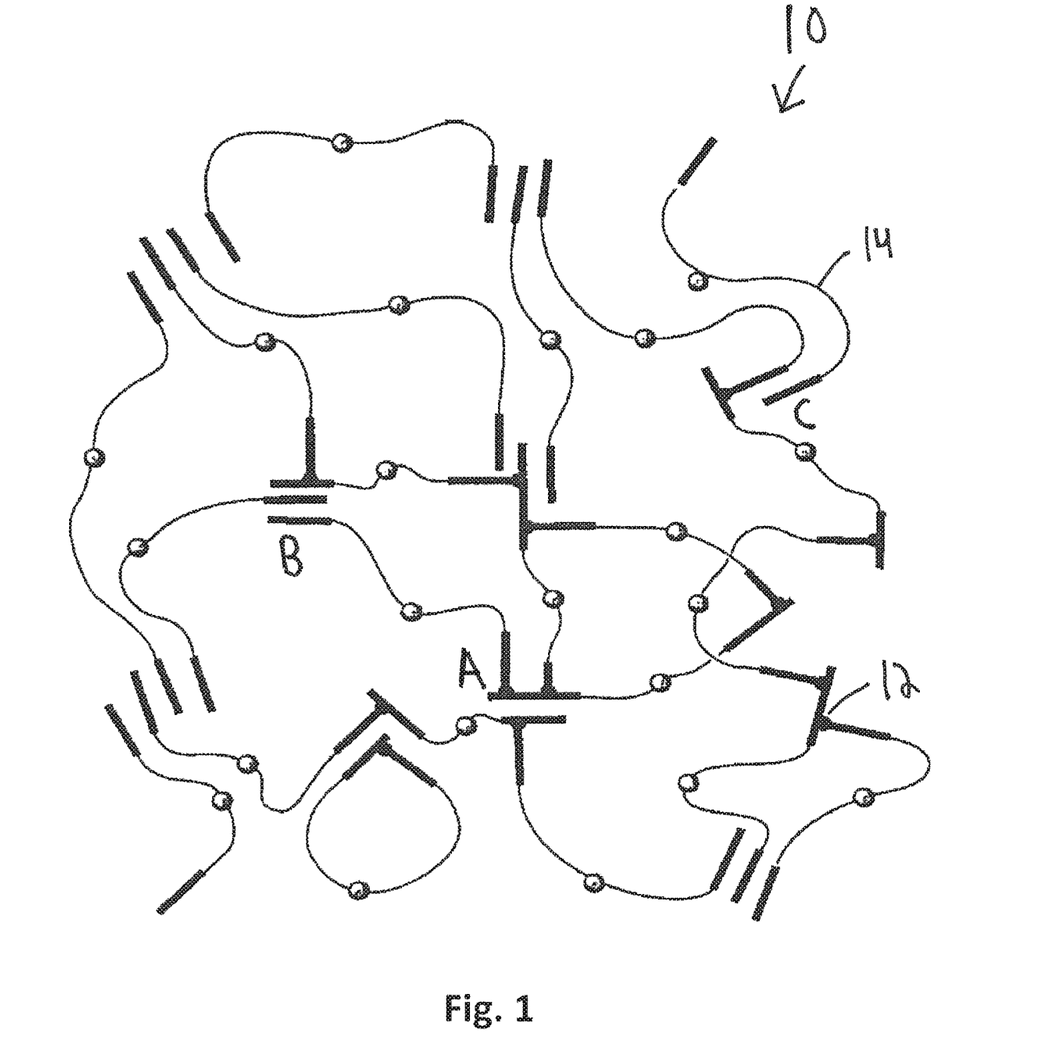
FIG. 1 is a representative microarchitecture of a representative thermoplastic elastomeric network comprising hyperbranched SIBS and linear SIBS.

In essence, the hyperbranched styrenic block copolymers of the thermoplastic elastomeric network of the present invention are highly branched styrenic tri-block copolymers structures that can potentially form any of a number of dendritic-like polymer structures. In some instances, dendrigraft polymers may be formed. The most distinguishing feature of dendrigraft polymers is that they most often incorporate randomly distributed branching points. The crosslinking at the non-terminal phenyl groups will form many different "branches", such as shown in FIG. 1. Thus, these copolymers are defined within the confines of this patent application as being hyperbranched. FIG. 1 shows a representative microarchitecture of a representative thermoplastic elastomeric network 10 comprising linear styrenic tri-block copolymers 14 and hyperbranched styrenic tri-block copolymers 12.

In one embodiment, when utilizing SIBS as the styrenic block copolymer, the network formed by the combination of the SIBS and the HB(SIBS) forms a network of straight bi-directional PSt-b-PIB-b-PSt having various PSt blocks covalently connected to each other so as to form multiple covalently-connected SIBS triblocks that yield high molecular weight (defined as a molecular weight greater than $10^5$ g/mole) structures. Again, when SIBS is utilized as the styrenic block copolymer, the thermoplastic elastomeric network will be represented by the acronym SIBS/HB(SIBS)$_n$X; wherein X will be a number which indicates the wt. % of the styrenic triblock copolymer, SIBS in this example, in the network. For example, SIBS/HB(SIBS)$_n$44 would indicate that the network contains 44 wt. % SIBS.

It has been found that the thermoplastic elastomeric network of the present invention exhibits advantageous mechanical properties such as, amongst others, high-strength and very low creep. The synthetic route taken to arrive at the thermoplastic elastomeric network of the present invention is important because the specific synthetic steps taken helps to arrive at a thermoplastic elastomeric network exhibiting advantageous mechanical properties such as, amongst others, high-strength and very low creep. An additional important feature of the synthesis of the thermoplastic elastomeric network of the present invention, is that the synthesis does not require the use of a costly bifunctional initiator, such as 1-(tert-butyl)-3,5-bis(2-chloropropan-2-yl)benzene, although the synthesis could utilize such an initiator. Instead, the synthesis of the thermoplastic elastomeric network is also able to utilize a less expensive bi-directional initiator.

In one or more embodiments of the present invention, the bi-directional initiator defined by the formula:

wherein x is Cl, OH, or OCH3.

When the term "high-strength" is used in the context of the present invention, it can be defined as a material having a tensile strength of greater than 20 MPa, or, an elongation, as defined on a stress-strain curve, of greater than 600%, as determined by ASTM D638—Plastic Tensile Strength Test, or, by being defined by having a toughness of about 4.2 MPa as determined by ASTM D638—Plastic Tensile Strength Test. It will be appreciated that linear SIBS on its own does not have such a high tensile strength, elongation or toughness, in that linear SIBS is well known to have tensile strength below 20 MPa, an elongation less than 400%, and a toughness of about 2.06 MPA as determined by the same ASTM standards.

When the term "very low creep" is used in the context of the present invention, it can be defined as a material having less than 0.5% creep as determined by ASTM D2990-77—Standard Test Method for Tensile, Compressive and Flexural Creep and Creep Rupture of Plastics. It will be appreciated that most styrenic block copolymers, such as linear SIBS, are well known to have poor creep properties. When considering the styrenic block copolymer SIBS, it is well known to that SIBS has creep much higher than, and well above, 0.5%, as determined by the same ASTM standard. Another way in which to define the term "very low creep" as used in the context of the present invention is a material that has a deformation under strain of about 1.30% as determined by ASTM D2990-77. Finally, the term "very low creep" as used in the context of the present invention can be defined as a material having a permanent set-nonrecoverable creep deformation of about 0.5% or less, as determined by ASTM D2990-77.

As stated above, the synthesis of the thermoplastic elastomeric network of the present invention is also provided. Generally, the thermoplastic elastomeric network of the present invention takes the following synthesis route. To begin, an initiator, such as those described above, is utilized to initiate the living cationic polymerization of a monomer suitable for living cationic polymerization, such as isobutylene.

Upon completion and/or conversion of the monomer to a polymer via living cationic polymerization, a different monomer, namely, styrene, is added to the living cationic polymerization process such that the styrene is converted to polystyrene at the living cationic ends of the polymer formed, namely, polyisobutylene. Upon completion and conversion of the styrene to polystyrene via living cationic polymerization, the styrenic block copolymers of the thermoplastic elastomeric network of the present invention are produced. In other words, the intermediate living polymer provided is then utilized to induce the living cationic polymerization of styrene, which is added to the polymerization process after conversion of the first monomer to a polymer. The result is a styrenic block copolymer, where, if a bi-direction initiator was used, a styrenic tri-block copolymer is formed.

Finally, by not terminating the living cationic polymerization process and maintaining the living cationic polymerization conditions for a period of time after the complete conversion of styrene to polystyrene, it is believed that aromatic alkylation occurs such that some of the styrenic block copolymers produced become chemically crosslinked as discussed above so as to form hyperbranched styrenic block copolymer, or hyperbranched styrenic tri-block copolymers. It will be appreciated that one of ordinary skill in the art familiar with polymerization of monomers via living cationic polymerization will readily understand the conditions necessary to maintain living cationic polymerization within the system. Generally, living isobutylene polymerization typically takes place in a mixed solvent system comprising a non-polar solvent, such as hexane, and a polar solvent, such as chloroform, chloromethane or dichloromethane, at temperatures below 0° C. Initiators can include the bi-directional initiators noted above and co-initiators can be any well-known compounds such as titanium tetrachloride, boron trichloride and other well-known organoaluminum halides. In one embodiment, living cationic polymerization of isobutylene is initiated by one of the bi-directional initiators above using co-initiator titanium tetrachloride at a temperature of −80° C. in hexane and methylene chloride. The living cationic polymerization process for styrene is maintained at −80° C. in hexane and methylene chloride. These are the same conditions that are maintained after complete conversion of the styrene to polystyrene for the styrenic block copolymers, which in this case is SIBS.

It will be appreciated that the living cationic polymerization conditions are continued for an extended period of time of from about 60 minutes to about 300 minutes such that aromatic alkylation occurs. As discussed above, aromatic alkylation provides for some of the styrenic block copolymers (e.g., SIBS) produced to be chemically crosslinked so as to from hyperbranched styrenic block copolymers. The chemically crosslinked hyperbranched styrenic block copolymers (e.g., HB(SIBS)$_n$) and the styrenic block copolymers (e.g., SIBS) then becomes physically crosslinked with other hyperbranched styrenic block copolymers along with some of the styrenic block copolymers remaining in the system to form the thermoplastic elastomeric network of the present invention.

In one embodiment of the present invention, the following synthesis route is taken to provide a thermoplastic elastomeric network defined as a SIBS/HB(SIBS)$_n$X network. To begin, an initiator is utilized to initiate the living cationic polymerization of isobutylene to prepare a bi-living polyisobutylene cation ($^+$PIB$^+$). If a tri-functional initiator were utilized, then a tri-living polyisobutylene cation would be created. The intermediate $^+$PIB$^+$ is then utilized to induce the living cationic polymerization of styrene so as to produce linear SIBS. Finally, the living cationic polymerization of styrene will be continued for an extended period of time such that aromatic alkylation occurs such that some of the linear SIBS produced becomes chemically crosslinked so as to from HB(SIBS)$_n$. The chemically crosslinked HB(SIBS)$_n$ then will become physically crosslinked with other HB(SIBS)$_n$ copolymers along with some of the linear SIBS remaining in the system to form the novel SIBS/HB(SIBS)$_n$X of the present invention.

In one or more embodiments of the present invention, such as during the creation of a SIBS/HB(SIBS)$_n$X network, during the first step of the synthesis, the $^+$PIB$^+$can be prepared in such a manner to create $^+$PIB$^+$having molecular weights appropriate for the soft segments typically present in a linear SIBS copolymer. In one embodiment of the present invention, $^+$PIB$^+$is prepared to have a molecular weight of from about 40,000 g/mol to about 70,000 g/mol.

In one or more embodiments of the present invention, such as during the creation of a SIBS/HB(SIBS)$_n$X network, during the second step of the synthesis, $^+$PIB$^+$is prepared utilizing isobutylene and a bi-directional initiator in the presence of TiCl$_4$, in a hexane/CH$_2$Cl$_2$ mixture at a temperature of approximately −80° C. The second step of the synthesis may begin with the introduction of DtPB and styrene diluted with CH$_2$Cl$_2$ (to prevent freezing at the mixing temperature of −80° C.).

In one embodiment of the present invention, such as during the creation of a SIBS/HB(SIBS)$_n$X network, the third step of the synthesis, i.e., the continuation of the living cationic polymerization process conditions such that aromatic alkylation occurs, takes place for 200 additional minutes to lead to a total reaction time of 290 minutes. In other embodiments of the present invention, the third step of the synthesis takes place for 210 additional minutes to lead to a total reaction time of 300 minutes.

In one embodiment of the present invention, such as the embodiment shown in FIG. 1, which shows a representative microarchitecture of a representative thermoplastic elastomeric network 10 comprising HB(SIBS)$_n$ 12 and linear SIBS 14, the HB(SIBS)$_n$ 12 of the SIBS/HB(SIBS)$_n$X thermoplastic elastomeric network 10 will be both chemically crosslinked and physically crosslinked through aggregation, and the linear SIBS 14 of the SIBS/HB(SIBS)$_n$X thermoplastic elastomeric network 10 will be physically crosslinked through aggregation. This can be clearly shown in FIG. 1 of the present invention, which shows how the hyperbranched SIBS 12 of the SIBS/HB(SIBS)$_n$X thermoplastic elastomeric network 10 are chemically crosslinked, such as, for example, at site A, while also being physically crosslinked through aggregation with both other hyperbranched SIBS 12 and linear SIBS 14, such as, for example at site B. Site B, along with site C, for example, also shows how the linear SIBS 14 of the SIBS/HB(SIBS)$_n$X thermoplastic elastomeric network 10 are only physically crosslinked through aggregation. This microarchitecture of the novel thermoplastic elastomeric network 10, constrains extensibility but leads to multiple entanglements and better stress distribution, which results in superior strength and the virtual absence of creep.

EXAMPLES

In order to demonstrate practice of the invention, the following examples are offered to more fully illustrate the invention, but are not to be construed as limiting the scope thereof. Further, while some of examples may include conclusions about the way the invention may function, the inventors do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is number average molecular weight, temperature is in degrees Centigrade, and pressure is at or near atmospheric.

Introductory Experiment

The scheme below outlines the synthesis route taken to arrive at SIBS/HB(SIBS)$_n$X thermoplastic elastomeric network as shown in FIG. 1:

Scheme 1

With the first step of the synthesis, a bBCB-diCl initiator was combining with TiCl$_4$ (1.71 mL, 1.6×10$^{-2}$ mol) and isobutylene (41.2 mL, 0.56 mol) in a hexane/CH$_2$Cl$_2$ (225/150 mL) mixture at −80° C. The living cationic polymerization of isobutylene took place for 60 minutes, then a sample was withdrawn. Then living cationic polymerization was allowed to continue for another 30 minutes, for a total of 90 minutes, and another sample was withdrawn. Living cationic polymerization was allowed to continue for another 30 minutes, for a total of 120 minutes, and another sample was withdrawn. Living cationic polymerization was allowed to continue for another 30 minutes, for a total of 150 minutes, and a final sample was withdrawn. The samples withdrawn after 60, 90, 120, and 150 minutes of polymerization were analyzed and the molecular weights of each sample were then determined. The molecular weights of each sample were needed to determine which time period was the best to begin the second step of the synthesis, which is the addition of styrene to the living polyisobutylene so as end the living cationic polymerization of isobutylene and begin the living cationic polymerization of styrene.

Next, DtPB (0.1 ml, 4.64×10$^{-4}$ mol) and styrene (20.7 ml, 1.81×10$^{-1}$ mol, diluted with 20 ml CH$_2$Cl$_2$ to prevent freezing at the −80° C. mixing temperature) was added into the mixture so as to complete the living cationic polymerization of isobutylene and to begin conducting living cationic polymerization of styrene. The mixture was then stirred for an additional 60 minutes, for a total reaction time of 210 minutes, and a sample was withdrawn for molecular weight determination. The living cationic polymerization of styrene was allowed to continue for an additional 30 minutes, for a total reaction time of 240 minutes, and a sample was withdrawn for molecular weight determination. After this sample was taken, the living cationic polymerization was terminated with the addition of approximately 5 mL of pre-chilled MeOH. The reactor was removed from the cooling bath and allowed to warm up to room temperature. The final product was precipitated into a large excess of methanol, dissolved in toluene, washed with 10% aqueous NaHCO$_3$, repeatedly with distilled water, precipitated into methanol, and dried in a vacuum at room temperature.

Figure 2A:
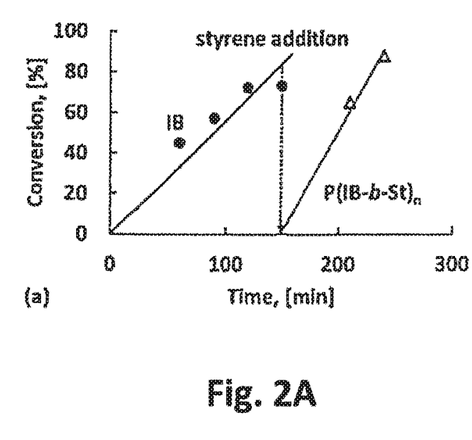
FIG. 2A shows a graph of the conversion of both isobutylene and styrene versus time during synthesis of an embodiment of the thermoplastic elastomeric network of the present invention.
Figure 2B:
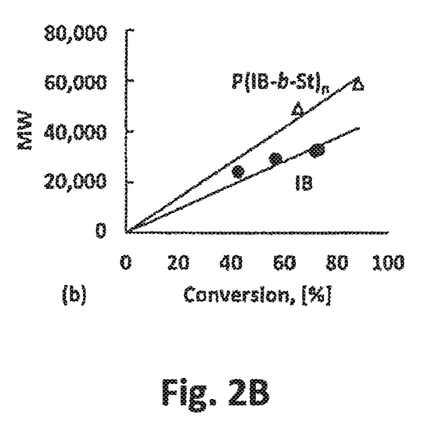
FIG. 2B shows a graph of the molecular weight of isobutylene and styrene as compared to their conversions during synthesis of an embodiment of the thermoplastic elastomeric network of the present invention.

FIG. 2A shows the conversion of both the isobutylene and styrene during the synthesis of the SIBS/HB(SIBS)$_n$X thermoplastic elastomeric network. FIG. 2A shows that the conversion of both isobutylene and styrene increase linearly with time, which suggests living systems during the living cationic polymerization of both the isobutylene and styrene. As expected, the slope of the line associated with the conversion of styrene is steeper than that of the conversion of isobutylene, which indicates faster living cationic polymerization of styrene. FIG. 2B shows the molecular weight of isobutylene and styrene as compared to their conversions during synthesis of the SIBS/HB(SIBS)nX thermoplastic elastomeric network. FIG. 2B shows that the molecular weights increase linearly with conversion, which is in line with the living cationic polymerizations of both the isobutylene and the styrene.

Figure 3:
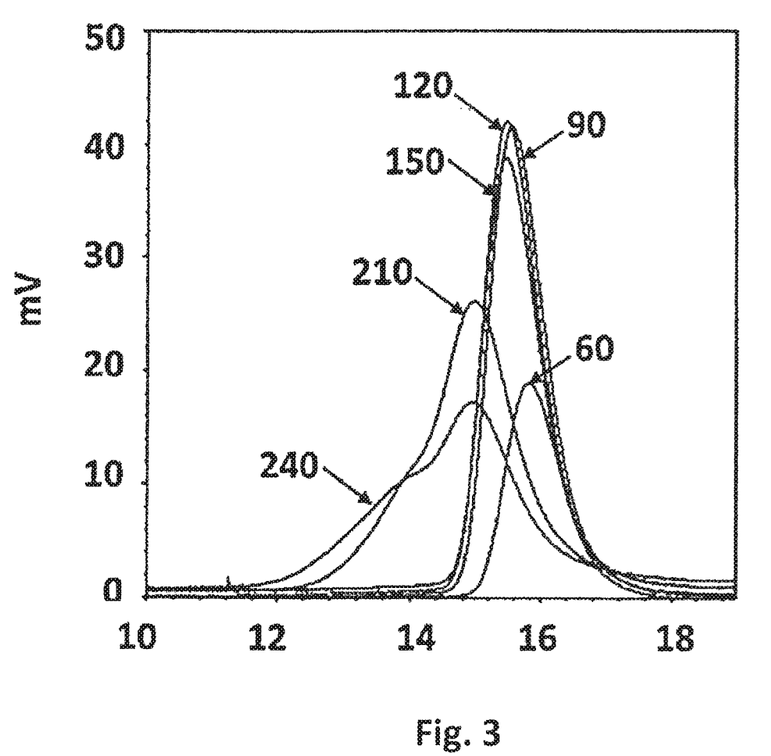
FIG. 3 shows a graph of GPC traces taken during the synthesis of an embodiment of the thermoplastic elastomeric network of the present invention, wherein the numbers shown indicate the sampling time in minutes that the traces were taken.

FIG. 3 shows GPC traces taken during the synthesis of the SIBS/HB(SIBS)$_n$X thermoplastic elastomeric network, wherein the numbers shown indicate the sampling time in minutes that the traces were taken. FIG. 3 shows GPC traces of samples taken at various times in the course of the synthesis. The initially narrow molecular weight distribution associated with the polyisobutylene phase broaden, then shift toward lower retention times (i.e., higher molecular weights), and then exhibit shoulders which indicate the presence of a very high molecular weight species (i.e., greater than 10$^6$ g/mol). Even the very high molecular weight products were soluble and a manual examination of the polymers formed suggested high strength and elongation.

The observations indicate initiation of the living cationic polymerization of styrene by the $^+$PIB$^+$, followed by reactions producing very high molecular weight soluble products. While not wanting to be bound by theory, it is surmised that the high molecular weight polymers were due to intermolecular electrophilic aromatic alkylation of pendant phenyl groups of polystyrene segments during the continued living cationic polymerization of styrene stage of the synthesis. With these intriguing findings in hand, continued experimentation was needed.

Continued Experimentation

The results of the introductory experiment was extended to elucidate the effect the length of the step of the continued living cationic polymerization of styrene had on the synthesis of the thermoplastic elastomeric networks of the present invention. Specifically, the effects of time on the molecular weights of both the hyperbranched styrenic tri-block copolymers and linear styrenic tri-block copolymers of the thermoplastic elastomeric networks, the characterizations of each member of the network, and to investigate the structures and physical properties of the thermoplastic elastomeric networks of the present invention.

Figure 4:
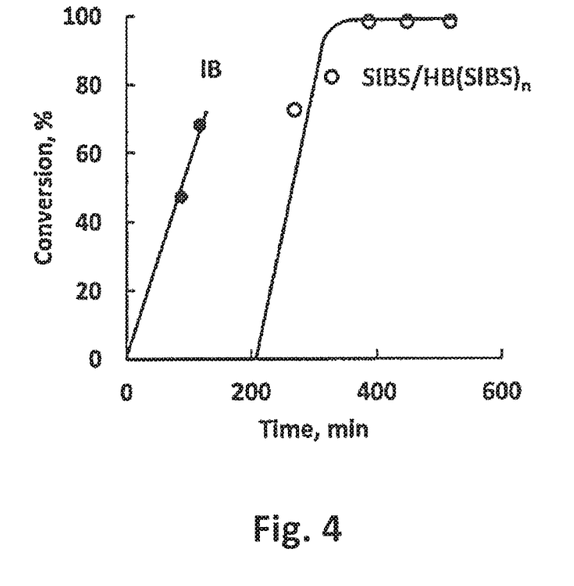
FIG. 4 shows a graph of the conversion of both isobutylene and styrene versus time during synthesis of an embodiment of the thermoplastic elastomeric network of the present invention.

Therefore, the introductory experiment, as detailed above, was carried out in the exact same manner, except the time of the continued living cationic polymerization of styrene step of the synthesis was extended to several hours. FIG. 4 shows conversion as a function of time during both the isobutylene and styrene during the living cationic polymerization of both polymers. In line with the results of the introductory experiment, the samples withdrawn at 90 and 120 minutes during the living cationic polymerization of isobutylene indicate linearly increasing molecular weights of the PIS by rather rapid living cationic polymerization. After 210 minutes of the living cationic polymerization of isobutylene (i.e., at the point orienting experiments indicated the molecular weight was approximately 35,000 g/mol), styrene was added to the mixture. The added styrene completed the living cationic polymerization of isobutylene and initiated the living cationic polymerization of styrene. In light of the living cationic polymerization of styrene being rapid, the samples withdrawn at 270 and 330 minutes of total reaction time reached greater than 90% styrene conversion. Even though the styrene conversion reached about 100% after about 390 minutes of total reaction time, sampling was continued until 520 minutes of total reaction time.

Figure 5:
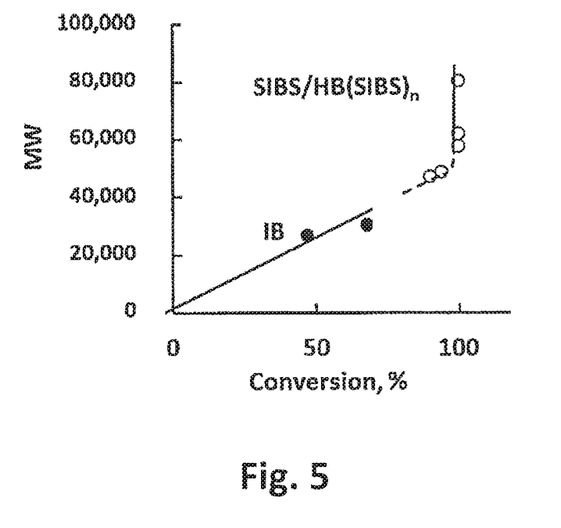
FIG. 5 shows a graph of the molecular weight of isobutylene and styrene as compared to their conversions during synthesis of an embodiment of the thermoplastic elastomeric network of the present invention.

FIG. 5 shows the molecular weight of isobutylene and styrene as compared to their conversions during the living cationic polymerization of both polymers. FIG. 5 shows that as the molecular weight is still increasing even after the conversion of styrene has completed, which indicates the formation of Friedel-Crafts alkylation.

Figure 6:
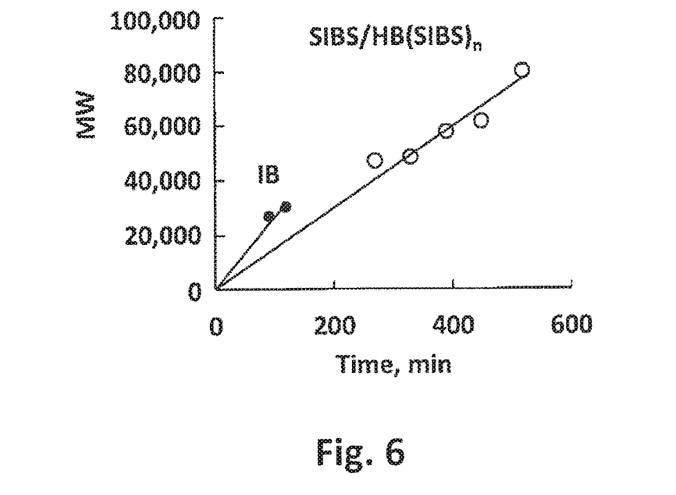
FIG. 6 shows a graph of the molecular weight of isobutylene and styrene over time during synthesis of an embodiment of the thermoplastic elastomeric network of the present invention.

FIG. 6 shows the molecular weight of isobutylene and styrene over time during the living cationic polymerization of both polymers. FIG. 6 shows that the molecular weights of the product formed during the continued living cationic polymerization of styrene step of the synthesis keep increasing over time, even past the point that the styrene conversion was completed (i.e., after about 390 minutes). As the rate of the living cationic polymerization of styrene is higher than the rate of the living cationic polymerization of isobutylene, it is unexpected that the rate of the molecular weight increase of the polystyrene block is lower than the rate of the molecular weight increase of the polyisobutylene block, evidenced by the slopes of the lines for each product. While not wanting to be bound by theory, it is surmised that the molecular weight increase during the continued living cationic polymerization step of the synthesis is not due to a living process, but to a separate reaction.

Figure 7:
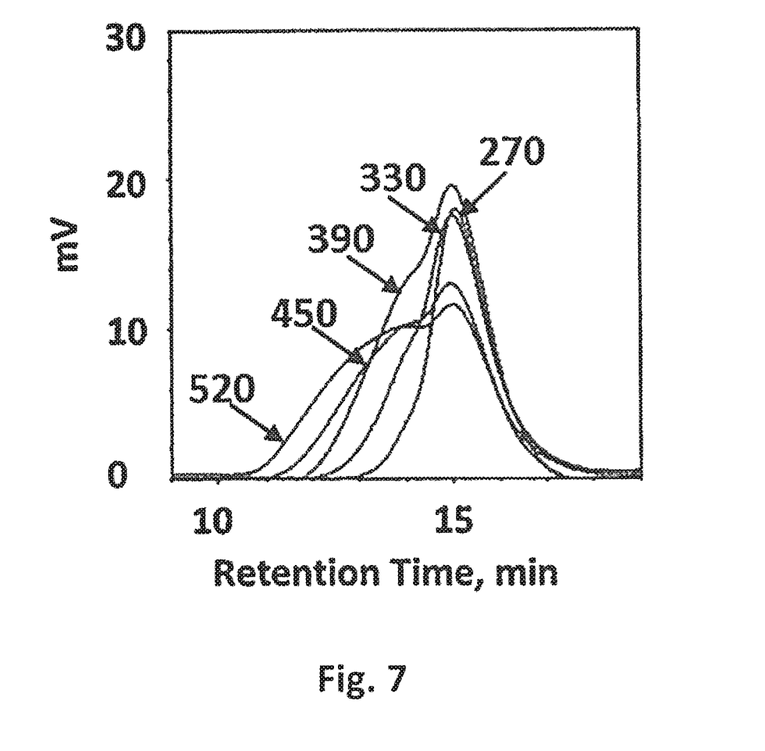
FIG. 7 shows GPC traces taken during the living cationic polymerization of styrene and the continued living cationic polymerization of styrene steps of the synthesis of an embodiment of the thermoplastic elastomeric network of the present invention, wherein the numbers shown indicate the sampling time in minutes that the traces were taken.
Figure 8A:
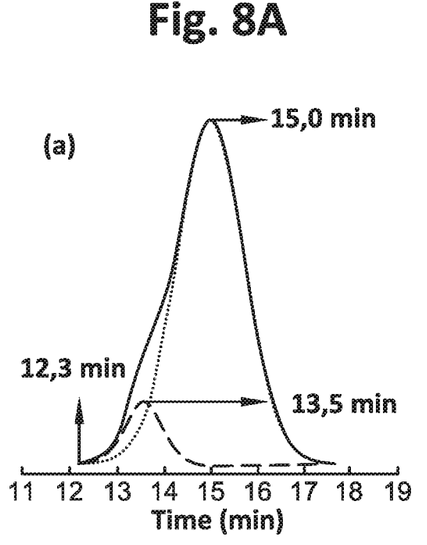
FIG. 8A shows the deconvolution of the GPC trace of FIG. 7 obtained at 270 minutes.
Figure 8B:
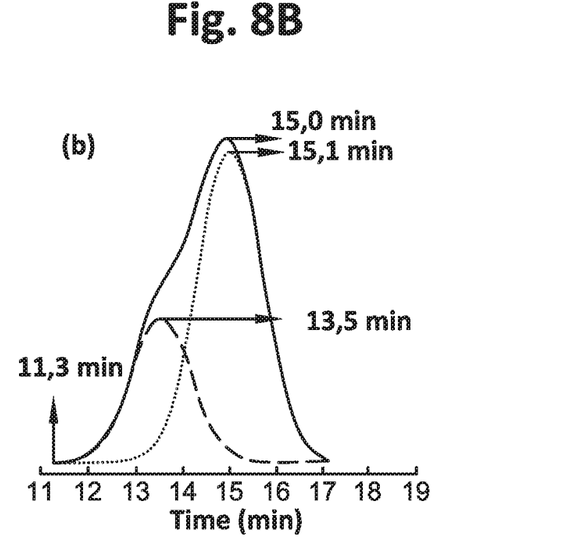
FIG. 8B shows the deconvolution of the GPC trace of FIG. 7 obtained at 330 minutes.
Figure 8C:
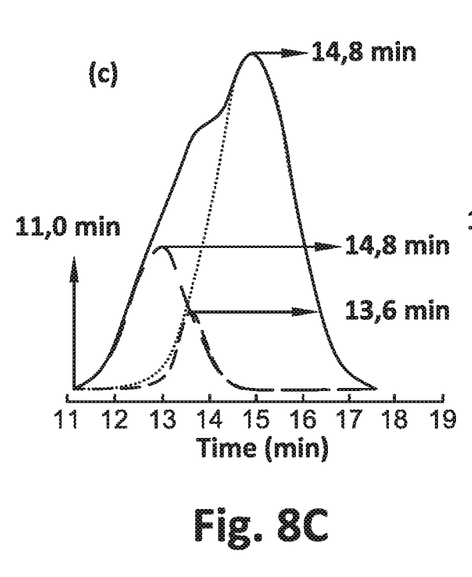
FIG. 8C shows the deconvolution of the GPC trace of FIG. 7 obtained at 390 minutes.
Figure 8D:
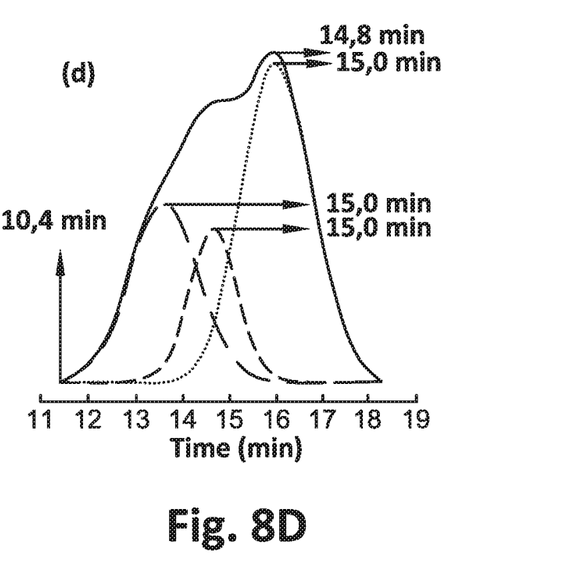
FIG. 8D shows the deconvolution of the GPC trace of FIG. 7 obtained at 450 minutes.

FIG. 7 shows GPC traces taken during the living cationic polymerization of styrene and the continued living cationic polymerization of styrene steps of the synthesis. Along the same lines of the results found in the introductory experiment, the traces broaden, shift towards higher molecular weights, and the shoulders suggest the formation of high molecular weight products over time. FIG. 8A shows the deconvolution of the GPC trace of FIG. 7 obtained at 270 minutes, FIG. 8B shows the deconvolution of the GPC trace of FIG. 7 obtained at 330 minutes, FIG. 8C shows the deconvolution of the GPC trace of FIG. 7 obtained at 390 minutes, and FIG. 8D shows the deconvolution of the GPC trace of FIG. 7 obtained at 450 minutes. The sample shown in FIG. 7 that was taken at 520 minutes could not be analyzed due to its excessively high molecular weight.

According to FIG. 8A, the molecular weight of the major product at 270 minutes was approximately 61,200 g/mol (peak at 15.00 min) and the molecular weight of the minor product was approximately 211,400 g/mol (peak at 13.5 min). According to FIG. 8B, the molecular weights of both the major product and the minor product at 330 minutes remain essentially unchanged, however, the relative amount of the major product decreased while that of the minor product increased significantly. According to FIG. 8C, the molecular weight of the main product at 390 minutes increased to approximately 74,000 g/mol (peak at 14.8 min) and a second minor product appeared, with the molecular weights of the minor species being approximately 192,000 g/mol and 380,000 g/mol (peaks at 13.6 and 12.8 min), respectively. According to FIG. 8D, the molecular weight of the main product and one of the minor products at 450 minutes showed relatively little change (approximately 74,000 g/mol and 192,000 g/mol respectively), however, the molecular weight of the second minor product increased to approximately 495,000 g/mol, and the relative amounts of both minor products increased substantially. The nominal molecular weight distributions recorded increased with time, which indicates the formation of various species having a wide molecular weight distribution.

Figure 9:
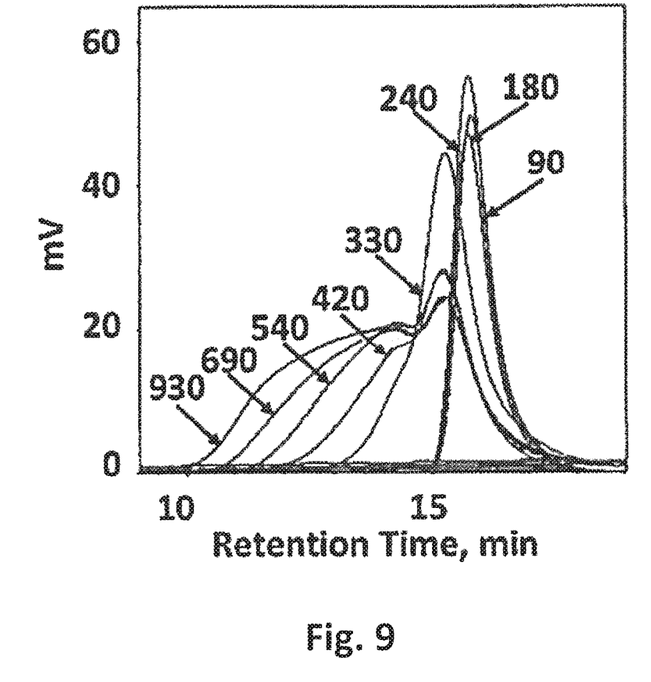
FIG. 9 shows GPC traces taken during the synthesis of an embodiment of the thermoplastic elastomeric network of the present invention, wherein the numbers shown indicate the sampling time in minutes that the traces were taken.

Without wishing to be bound by theory, based on the data collected, it is surmised that the increasingly high molecular weight products are due to inter-molecular and intra-molecular aromatic substitution of polystyrene segments by growing styrene cations, a process which leads to a network of high molecular hyperbranched styrenic tri-block copolymers and linear styrenic tri-block copolymers Initiator Comparison Experiment As a comparison experiment, a thermoplastic elastomeric network comprising hyperbranched styrenic tri-block copolymers and linear styrenic tri-block copolymers was created utilizing 1-(tert-butyl)-3,5-bis(2-chloropropan-2-yl)benzene instead of the bBCB-diCl initiator as shown in Scheme 1. The synthesis was undertaken in the exact same manner as shown in Scheme 1, except that the initiator utilized in the first step was different. FIG. 9 shows the GPC traces of the products obtained in the experiment utilizing 1-(tert-butyl)-3,5-bis(2-chloropropan-2-yl)benzene as the initiator. The GPC traces of FIG. 9 and the GPC traces shown in FIG. 7 are virtually identical (when compared at similar time segments of the experiments), which indicates that the mechanism of these processes (see Scheme 1) is essentially identical.

Comparison Experiment

To show the beneficial and unexpected strength and creep properties of the thermoplastic elastomeric networks of the present invention, a SIBS/HB(SIBS)$_n$44 was prepared in accordance with the above mentioned synthesis, and its properties were compared to a linear SIBS copolymer, which is the fundamental building block of the SIBS/HB(SIBS)$_n$44 thermoplastic elastomeric network. The linear SIBS was prepared in a similar manner to the SIBS/HB(SIBS)$_n$44 thermoplastic elastomeric network, meaning that the same initiator was used. However, the living cationic polymerization of the linear SIBS was the last step of the synthesis, meaning that there was no step of continued living cationic polymerization styrene such that aromatic alkylation occurs.

Figure 10:
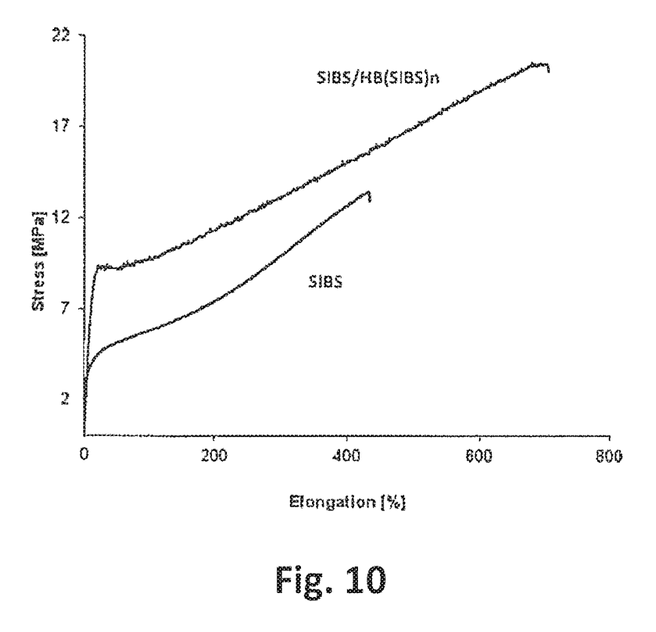
FIG. 10 shows stress strain traces of a linear SIBS and a SIBS/HB(SIBS)$_n$44 thermoplastic elastomeric network made in accordance with the present invention.
Figure 11:
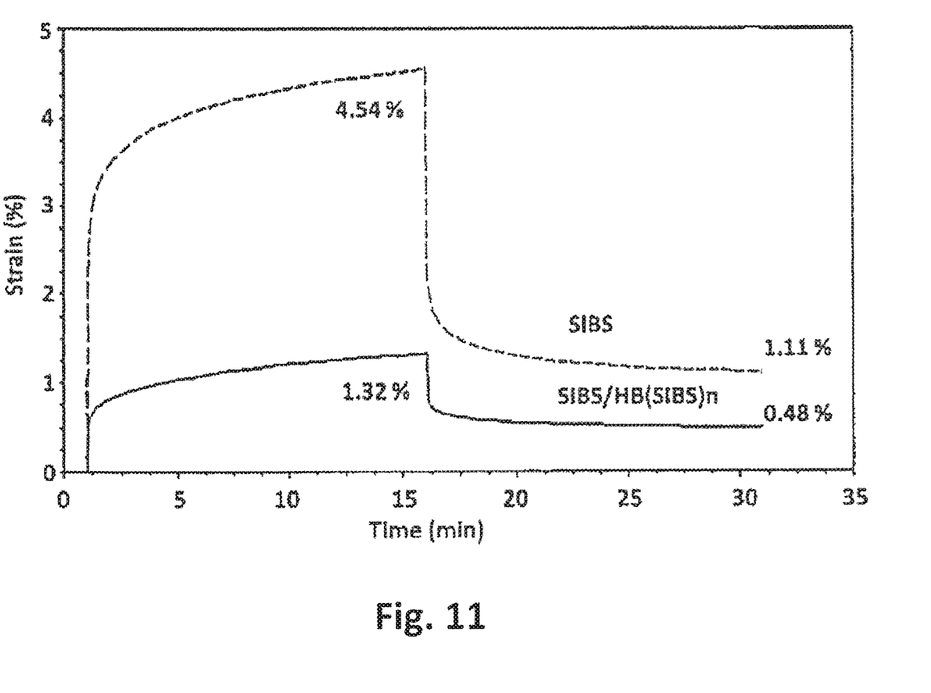
FIG. 11 shows creep strain and creep recovery in terms of time-dependent deformation of a linear SIBS and a SIBS/HB(SIBS)$_n$44 thermoplastic elastomeric network made in accordance with the present invention

FIG. 10 shows stress strain traces of a linear SIBS and a SIBS/HB(SIBS)$_n$44 thermoplastic elastomeric network made in accordance with the present invention and FIG. 11 shows creep strain and creep recovery in terms of time-dependent deformation of a linear SIBS and a SIBS/HB(SIBS)$_n$44 thermoplastic elastomeric network made in accordance with the present invention. The information gleaned from FIGS. 10 and 11 are broken down in Table 1 below:

TABLE 1

|  | Stress (MPa) | Elongation (%) | E Modulus (MPa) | W (MPa) |
|---|---|---|---|---|
| Linear SIBS | 14.4 | 430 | 11.5 | 2.06 |
| SIBS/HB(SIBS)$_n$44 | 20.5 | 703 | 10.5 | 4.20 |

Whereas linear SIBS exhibits a typical 14.4 MPa tensile strength and a 430% elongation at break, the mechanical response of SIBS/HB(SIBS)$_n$44 thermoplastic elastomeric network is quite different. The SIBS/HB(SIBS)$_n$44 is stronger in part due to the ordered PSt hard domains are held together by a multiplicity of complex entanglements (See FIG. 1). Furthermore, the SIBS/HB(SIBS)$_n$44 is very strong at all elongations, which in turn leads to very high toughness.

The SIBS/HB(SIBS)$_n$44 shows four times less deformation than the linear SIBS and an extremely low permanent deformation set. These results translate into very high dimensional stability and virtual complete recoverability. Exceptionally high creep resistance and low permanent set suggest highly restricted disentanglement (i.e., essentially permanent entanglement) of chain elements within the network.

In light of the foregoing, it should be appreciated that the present invention significantly advances the art by providing a novel structure and synthesis of a thermoplastic elastomeric network comprising hyperbranched styrenic block copolymers and styrenic block copolymers that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method of synthesizing a thermoplastic elastomeric network comprising hyperbranched styrenic block copolymers and styrenic block copolymers comprising:

initiating living cationic polymerization of monomers, to form polymers having living cationic ends, wherein the step of initiating utilizes a bi-directional initiator defined by the formula:

wherein X is Cl, OH, or OCH$_3$;

adding styrene after the completion of the living cationic polymerization of the monomers, thereby conducting living cationic polymerization of styrene to the living cationic ends of the polymers to form living cationic copolymers having living cationic styrenic ends;

completing the living cationic polymerization of styrene; and continuing living cationic polymerization conditions after the completion of the living cationic polymerization of the styrene that form the living cationic copolymers, whereby some of the living cationic styrenic ends are crosslinked to phenyl groups of styrene within the copolymers by Friedel-Crafts alkylation, and wherein the step of continuing living cationic polymerization conditions continues for a time period of from about 60 to about 300 minutes prior to termination of the living cationic polymerization conditions, such that a total time period of synthesizing the thermoplastic elastomeric network is from about 240 to about 480 minutes, whereby nominal molecular weight distribution of the living cationic copolymers is increased with time due to the formation of hyperbranched styrenic block copolymers.

2. The method of claim 1, wherein the monomers are isobutylene monomers.

3. A method of synthesizing a thermoplastic elastomeric network comprising hyperbranched styrenic block copolymers and styrenic block copolymers comprising:

initiating living cationic polymerization of monomers, to form polymers having living cationic ends, wherein the step of initiating utilizes 1-(tert-butyl)-3,5-bis(2-chloropropan-2-yl)benzene as the initiator;

adding styrene after the completion of the living cationic polymerization of the monomers, thereby conducting living cationic polymerization of styrene to the living cationic ends of the polymers to form living cationic copolymers having living cationic styrenic ends;

completing the living cationic polymerization of styrene; and continuing living cationic polymerization conditions after the completion of the living cationic polymerization of the styrene that form the living cationic copolymers, whereby some of the living cationic styrenic ends are crosslinked to phenyl groups of styrene within the copolymers by Friedel-Crafts alkylation, and wherein the step of continuing living cationic polymerization conditions continues for a time period of from about 60 to about 300 minutes prior to termination of the living cationic polymerization conditions, such that a total time period of synthesizing the thermoplastic elastomeric network is from about 240 to about 480 minutes, whereby nominal molecular weight distribution of the living cationic copolymers is increased with time due to the formation of hyperbranched styrenic block copolymers.

4. The method of claim 3, wherein the monomers are isobutylene monomers.

* * * * *